US011981120B2

United States Patent
(12) United States Patent
Nagao

(10) Patent No.: US 11,981,120 B2
(45) Date of Patent: May 14, 2024

(54) IMAGE-FORMING APPARATUS

(71) Applicant: Konica Minolta, Inc., Tokyo (JP)

(72) Inventor: Shinichi Nagao, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 204 days.

(21) Appl. No.: 17/726,634

(22) Filed: Apr. 22, 2022

(65) Prior Publication Data

US 2022/0339949 A1 Oct. 27, 2022

(30) Foreign Application Priority Data

Apr. 22, 2021 (JP) ................................ 2021-072733

(51) Int. Cl.
*B41J 11/00* (2006.01)

(52) U.S. Cl.
CPC ............................... *B41J 11/00214* (2021.01)

(58) Field of Classification Search
CPC .............. B41J 11/00214; B41J 11/0021; B41J 11/00212; B41J 11/0022; B41J 11/007
See application file for complete search history.

(56) References Cited

U.S. PATENT DOCUMENTS

2016/0023476 A1* 1/2016 Leighton .................. F26B 3/02 347/102

FOREIGN PATENT DOCUMENTS

JP 2010162701 A 7/2010
JP 2011056900 A 3/2011
JP 2019104198 A 6/2019

* cited by examiner

*Primary Examiner* — Bradley W Thies
(74) *Attorney, Agent, or Firm* — CANTOR COLBURN LLP

(57) ABSTRACT

An image-forming apparatus which can improve the heating stability of the recording material in the heating unit is provided. An image-forming apparatus constitutes an image forming apparatus having: a recording-material heating unit disposed in an upstream side of an image-former; a chassis that covers the recording-material heating unit; a pressurizer that is provided in the chassis and increases an air pressure in the chassis; and a gas inflow opening that is provided in the chassis and supplies air to the pressurizer from outside the chassis.

13 Claims, 6 Drawing Sheets

IMAGE-FORMING APPARATUS

CROSS-REFERENCE TO RELATED APPLICATIONS

The present invention claims priority under 35 U.S.C. § 119 to Japanese patent Application No. 2021-72733, filed on Apr. 22, 2021, the entire content of which is incorporated herein by reference.

BACKGROUND

Technological Field

The present invention relates to an image-forming apparatus.

Description of the Related Art

There is an image-forming apparatus which discharges ink onto a recording material to form an image on the recording material. Many of the inks used in the image-forming apparatus have differences in a final state such as color development or glazing depending on the temperature state, etc. after landing on the recording material. In such a case, temperature control for heating the recording material to an appropriate temperature is important.

As a method of heating the recording material before ink landing to an appropriate temperature, a configuration in which a contact-type heating unit using a heating roller or the like in an upstream side of an image-former is widely used (for example, see Patent Literature 1). In this heating unit, the recording material which is an ink discharge target is caused to abut the heating roller to heat the recording material to an appropriate temperature in advance before landing of the ink.

On the other hand, the heating unit of the contact type using a heating roller or the like has problems that, for example, the surface of the recording material is finely damaged or a surface reforming effect of corona treatment or the like is lowered due to heat or pressure. Therefore, a configuration of an image-forming apparatus provided with a heating unit of a contactless type using a sheathed heater or the like has been proposed.

However, in the heating method of the contactless type, problems of lowered heating stability occur, for example, the air drawn by the conveyed recording material enters the heating unit, the heating efficiency with respect to the recording material is lowered, and uniformity in the in-plane temperature of the recording material is lowered. As a measure therefor, an image-forming apparatus having a configuration which provides a temperature sensor between two heating units and feeds back the temperature of the first heating unit to the control of the second heating unit has been proposed (for example, see Patent Literature 2). Also, in order to enhance the in-plane temperature uniformity, an image-forming apparatus having a configuration which alternately carries out blowing from a conveyance width direction has been proposed (for example, see Patent Literature 3).

RELATED ART LITERATURE

Patent Literature

Patent Literature 1: JP 2019-104198 A
Patent Literature 2: JP 2010-162701 A
Patent Literature 3: JP 2011-056900

SUMMARY

However, the above-described configurations cannot sufficiently restrict reduction in the heating stability of the recording material caused by inflow of air into the heating unit. Particularly, since speed-up of the conveyance velocity of the recording material has been required recently, further improvement in the heating stability is required.

In order to solve the above-described problems, the present invention provides an image-forming apparatus which can improve the heating stability of the recording material in the heating unit.

An image-forming apparatus of the present invention has: a conveyer that conveys a recording material; an image-former that discharges ink to the conveyed recording material; and a recording-material heating unit that heats the recording material disposed in an upstream side in the direction of conveyance of the recording material by the conveyer with respect to the image-former. In addition, a chassis that covers the recording-material heating unit, has a recording-material inlet provided in the upstream side in the conveyance direction of the recording material with respect to the recording-material heating unit, and has a recording-material outlet provided in a downstream side in the conveyance direction of the recording material with respect to the recording-material heating unit; a pressurizer that is provided in the chassis and increases the air pressure in the chassis; and a gas inflow opening that is provided in the chassis and supplies air to the pressurizer from outside the chassis are provided.

Also, an image-forming apparatus of the present invention has: a conveyer that conveys a recording material; an image-former that discharges ink onto the conveyed recording material; a recording-material heating unit that heats the recording material disposed in an upstream side in a conveyance direction of the recording material with respect to the image-former; and a chassis that covers the recording-material heating unit, has a recording-material inlet provided in the upstream side in the conveyance direction of the recording material with respect to the recording-material heating unit, and has a recording-material outlet provided in a downstream side in the conveyance direction of the recording material with respect to the recording-material heating unit, the recording-material outlet having a smaller opening area than the recording-material inlet.

According to an embodiment of the present invention, the image-forming apparatus which can improve the heating stability of the recording material in the heating unit can be provided.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, examples of embodiments for carrying out the present invention will be described, but the present invention is not limited by the following examples.

Note that the descriptions will be given in a following order.

1. First Embodiment of Image-Forming Apparatus
2. Second Embodiment of Image-Forming Apparatus
3. Third Embodiment of Image-Forming Apparatus
4. Fourth Embodiment of Image-Forming Apparatus

1. First Embodiment of Image-Forming Apparatus

Hereinafter, a specific embodiment of an image-forming apparatus of the present invention will be described.

Figure 1:
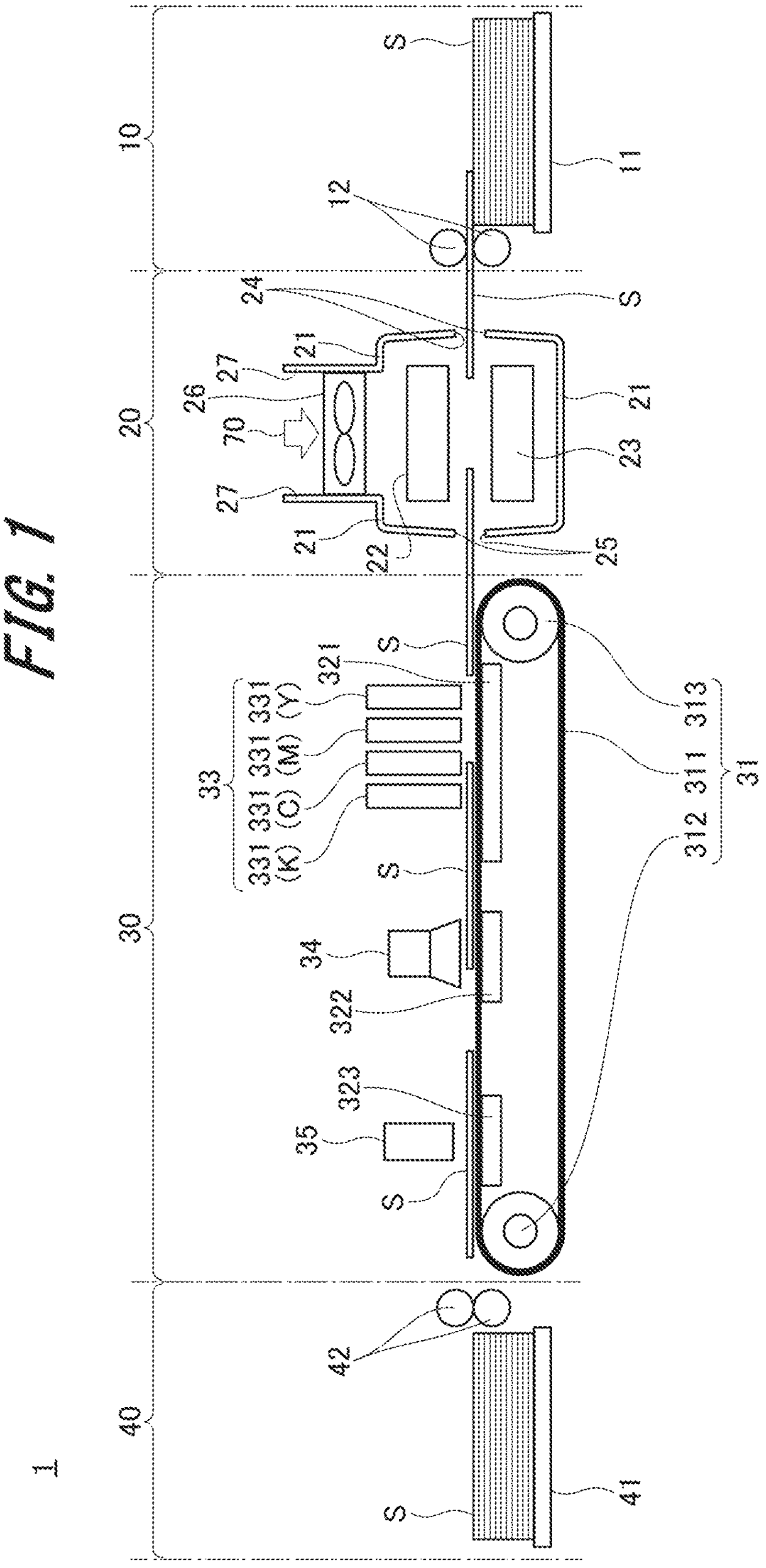
FIG. 1 is a diagram illustrating a rough configuration of an image-forming apparatus of a first embodiment.

FIG. 1 illustrates a rough schematic diagram of an image-forming apparatus of the present embodiment. The image-forming apparatus 1 illustrated in FIG. 1 is provided with a recording-material supplier 10, a heating unit 20, an image-former 30, a recording-material discharger 40, and an unshown controller 50 (see FIG. 3).

Recording-Material Supplier

The recording-material supplier 10 is provided with a placement tray 11, a sending roller 12, etc. The recording-material supplier 10 stocks recording materials S on the placement tray 11, drives the sending roller 12 at appropriate timing for carrying out image formation, and sequentially supplies the recording materials S to the heating unit 20.

The placement tray 11 is a plate-like member on which the recording materials S can be stacked and placed and sends the recording materials S, which are placed on an uppermost part thereof, to the heating unit 20. The recording materials S placed on the placement tray 11 are not particularly limited, and examples of the recording materials S include films, acrylic plates, plates of resin such as PET, paper sheets, heavy paper, and cardboard materials. The placement tray 11 can be moved in the vertical direction. In this case, the position thereof is maintained so that the uppermost recording material S is retained at a position for sending to the heating unit 20 depending on the total weight, etc. of the recording materials S placed thereon.

The sending roller 12 pinches the recording material S from top and bottom and sends the recording material to the heating unit 20. The recording-material supplier 10 has an unshown guide member which limits the recording material S in a predetermined range in a direction (width direction) orthogonal to a sending direction (conveyance direction) in a conveyance surface of the recording material S. The sending roller 12 sends the recording material S to an appropriate position and direction.

Heating Unit

The heating unit 20 has a first recording-material heating unit 22, which heats an image-formation-surface side of the conveyed recording material S, and a second recording-material heating unit 23, which heats a back-surface side of the recording material S. Also, the heating unit 20 has a chassis 21, which covers the first recording-material heating unit 22 and the second recording-material heating unit 23. The chassis 21 has a recording-material inlet 24, which is provided in the upstream side in the conveyance direction of the recording material S, and a recording-material outlet 25, which is provided in the downstream side. Furthermore, the heating unit 20 has a pressurizer 26, which increases the air pressure in the chassis 21, a gas inflow opening 27, which is provided in the chassis 21 for supplying air 70 from outside the chassis 21 to the pressurizer 26. Note that the flows of air in the heating unit 20 are illustrated by arrows.

Figure 3:
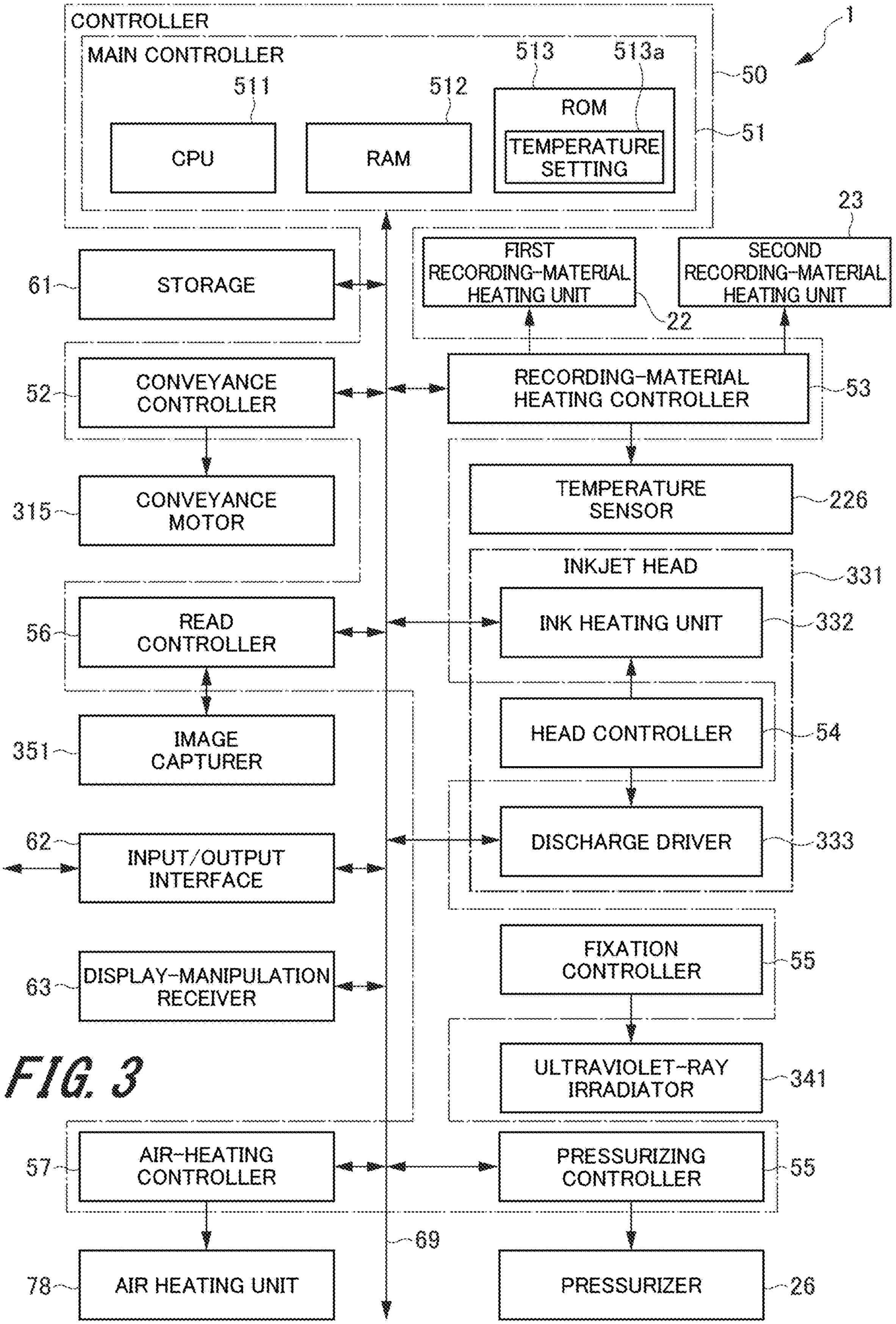
FIG. 3 is a block diagram illustrating a main configuration of the image-forming apparatus.

Also, the heating unit 20 is provided with an unshown temperature sensor 226 (FIG. 3). The temperature sensor 226 measures the temperature of the air in the chassis 21 and outputs the temperature to the controller 50 (FIG. 3). As the temperature sensor 226, a conventionally known semiconductor temperature sensor or the like can be used.

First Recording-Material Heating Unit, Second Recording-Material Heating Unit The first recording-material heating unit 22 and the second recording-material heating unit 23 are not particularly limited as long as the recording material S can be heated without contact, and, for example, contactless heating apparatuses such as sheathed heaters, carbon heaters, and cartridge heaters can be applied.

An object of heating of the recording material S in the heating unit 20 is for controlling the state of ink after landing on the recording material S and to control the temperature of the image formation surface of the recording material S. Therefore, in the heating unit 20, the recording material S is heated so that an appropriate temperature is obtained when the ink lands thereon. Based on the temperature of the interior air of the chassis 21 measured by the temperature sensor 226 (FIG. 3), output of the heating unit 20 is controlled by the controller 50 (FIG. 3).

The first recording-material heating unit 22 and the second recording-material heating unit 23 are independently controlled by the controller 50 (FIG. 3). By independently controlling the first recording-material heating unit 22 and the second recording-material heating unit 23, the image formation surface and the back surface of the recording material S can be heated to different temperatures, respectively. Particularly, the temperature of the back-surface side of the recording material S is set to a temperature which is different from that of the image formation surface in some cases in consideration of heat transfer of the recording material S for temperature control of the image formation surface.

In this manner, the temperature of the image formation surface of the recording material S can be controlled with higher accuracy by independently controlling the output of the first recording-material heating unit and the output of the second recording-material heating unit by the controller 50.

Chassis

The chassis 21 is a member which covers the first recording-material heating unit 22 and the second recording-material heating unit 23 and retains interior air. In the chassis 21, a recording-material inlet 24, which is a slit-like opening which allows passage of the recording materials S, is provided at an upstream-side end (receiving end) in the conveyance direction of the recording material S. Also, in the chassis 21, a recording-material outlet 25, which is a slit-like opening which allows passage of the recording materials S, is provided at a downstream-side end (sending end) in the conveyance direction of the recording material S.

Furthermore, the chassis 21 is provided with the gas inflow opening 27 for supplying the air 70 to the pressurizer 26. The gas inflow opening 27 is provided at a position different from the positions of the recording-material inlet 24 and the recording-material outlet 25 and is provided at the position from which the air 70 can be sent to the pressurizer 26. Preferably, the gas inflow opening 27 is provided at a position opposed to the recording-material inlet 24 via the pressurizer 26. In other words, the gas inflow opening 27 is provided at the position so that the air 70, which has flowed in from the gas inflow opening 27, reaches the recording-material inlet 24 after passing through the pressurizer 26. Therefore, the gas inflow opening 27 is formed in the chassis 21 based on the relative positional relation with the disposition of the pressurizer 26 and the recording-material inlet 24.

The part of the chassis 21 except for the recording-material inlet 24, the recording-material outlet 25, and the gas inflow opening 27 is preferred to be sealed. As a result, inflow of air into the chassis 21 is restricted. Also, the chassis 21 can be configured to further restrict in and out of heat by using a known member which has high thermal insulation performance. The interior of the chassis 21 may or may not be visible.

Pressurizer

The pressurizer 26 is provided in the chassis 21 in order to maintain the air pressure in the chassis 21 higher than that of outside the chassis 21. As the pressurizer 26, for example, a blower apparatus, an air compressor, or the like can be used. The pressurizer 26 controls drive and output by the controller 50 (FIG. 3). When the controller 50 controls the drive and output of the pressurizer 26, the air pressure in the chassis 21 can be controlled.

Also, the gas inflow opening 27 for supplying the air 70 from outside to the pressurizer 26 is provided in the chassis 21, and the air 70 is supplied from the gas inflow opening 27 to the pressurizer 26. Therefore, the air 70 is sent into the chassis 21 by the pressurizer 26, and the overall air pressure in the chassis 21 becomes higher than the air pressure of outside the chassis 21.

By increasing the air pressure in the chassis 21 by the pressurizer 26 in this manner, inflow of air into the chassis 21 can be restricted when the recording material S is conveyed to the chassis 21.

Figure 2:
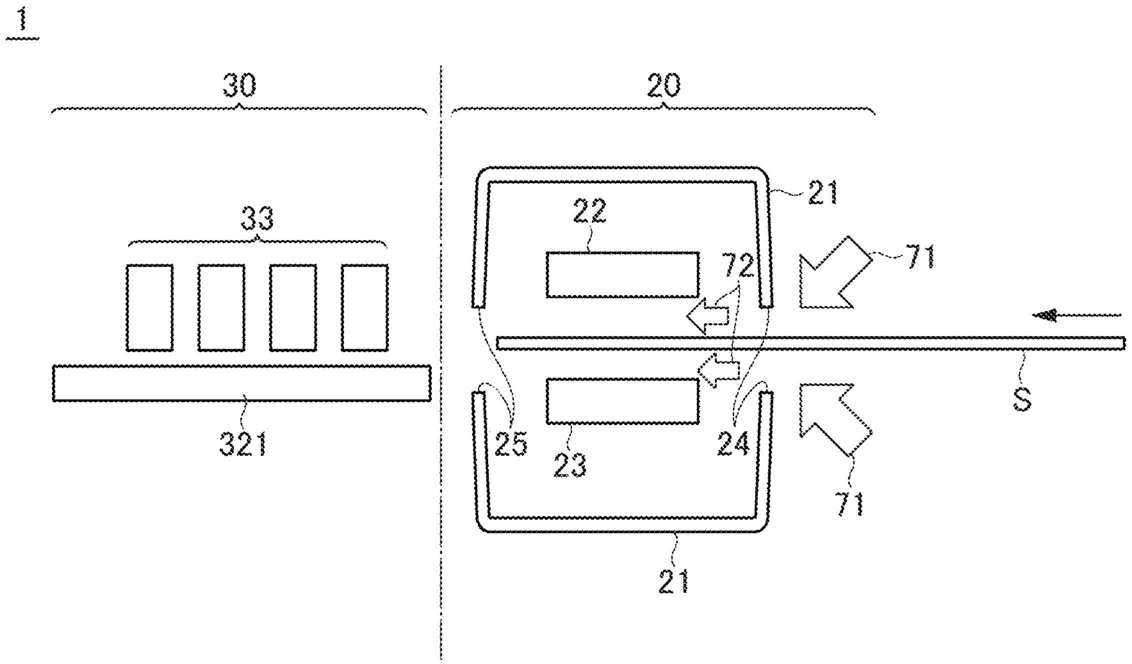
FIG. 2 is a diagram illustrating a configuration of a heating unit in which a pressurizer is not provided in a chassis.

For example, a configuration of the heating unit 20 in which the pressurizer 26 is not provided in the chassis 21 is illustrated in FIG. 2. FIG. 2 is a diagram illustrating part of the heating unit 20 and the image-former 30 in the image-forming apparatus 1 illustrated in FIG. 1. FIG. 2 illustrates a state in which the recording material S is being conveyed into the chassis 21. Also, FIG. 2 only illustrates the image-formation operator 33 and the supporter 321 as the image-former 30.

As illustrated in FIG. 2, the recording material S is conveyed from the recording-material inlet 24 into the chassis 21. In this process, outside air 71 flows into the chassis 21 from the recording-material inlet 24 in a manner that the air is drawn by conveyance of the recording material S. Then, the air 72, which has flowed into the chassis 21, enters the part between the first recording-material heating unit 22, the second recording-material heating unit 23, and the recording material S.

While the image-forming apparatus 1 is being driven, normally, the temperature in the chassis 21 is higher than that of outside due to the first recording-material heating unit 22 and the second recording-material heating unit 23. Therefore, the temperature in the chassis 21 is lowered due to inflow of the air 71 from outside. Also, the air 72 which has entered the chassis 21 cools the first recording-material heating unit 22 and the second recording-material heating unit 23 in the upstream side in the conveyance direction of the recording material S in the chassis 21. Therefore, in the heating unit 20, the temperature in the upstream side is lowered more than the temperature in the downstream side, and uniformity in the in-plane temperature in the heating unit 20 is lowered.

In this manner, in the heating unit 20, the heating stability of the recording material S is lowered due to inflow of the air 71 into the chassis 21. Particularly, the higher the conveyance velocity of the recording material S, the more the air 71 which is drawn by conveyance of the recording material S and flows into the chassis 21. Therefore, the heating stability tends to be lowered more.

Therefore, like the image-forming apparatus 1 illustrated in FIG. 1, the chassis 21 is provided with the pressurizer 26 to increase the air pressure in the chassis 21 so that the air pressure is higher than that of outside the chassis 21. By virtue of this, inflow of the air 71, which is drawn by the conveyance of the recording material S, into the chassis 21 can be restricted. As a result, lowering in the uniformity of the in-plane temperature due to the inflow of the air 72 into the heating unit can be restricted, and lowering in the heating stability of the recording material S in the heating unit 20 can be sufficiently restricted.

Image-Former

The image-former 30 is provided in a downstream side of the heating unit 20 in the conveyance direction of the recording material S. The image-former 30 discharges and fixes ink onto the surface of the recording material S, which has been conveyed from the heating unit 20, to form an image, and sends the recording material S, on which the ink is fixed, to the recording-material discharger 40. The image-former 30 is provided with a conveyer 31, supporters 321, 322, and 323, an image-formation operator 33, a fixer 34, a reader 35, etc.

The conveyer 31 has a conveyance belt 311, a drive roller 312, a driven roller 313, etc. The conveyance belt 311 is an endless belt-like member, which is suspended between the drive roller 312 and the driven roller 313 and is longer than the recording material S. The conveyance belt 311 is not particularly limited, but a resin or steel belt is used. The conveyance belt 311 revolves when the drive roller 312 is subjected to rotary drive by a conveyance motor 315 (see FIG. 3). As a result, the recording material S placed on an outer peripheral surface (conveyance surface) of the conveyance belt 311 is conveyed at the revolving speed of the conveyance belt 311. In this case, the single conveyance belt 311 conveys the recording material S from the heating unit 20 to the recording-material discharger 40. However, the recording material S may be conveyed by being passed by plural conveyance belts.

Each of the supporters 321, 322, and 323 is provided along the conveyance belt 311 in an inner peripheral surface side of the conveyance belt 311. The supporter 321 is provided in a range including the range corresponding to an ink discharge range of the image-formation operator 33. The supporter 322 is provided in a range including the range corresponding to an ink fixation range of the fixer 34. The supporter 323 is provided in a range including the range corresponding to a reading range of the reader 35. The supporters 321, 322, and 323 supports the recording material S, which is placed on the conveyance belt 311, by supporting the revolving conveyance belt 311 to maintain the recording material S at appropriate positions in the ink discharge range, the ink fixation range, and the reading range, respectively. Preferably, a configuration in which the supporters 321, 322, and 323 have fine pores and cause the recording material S to be more stably suctioned to the conveyance belt 311 by suctioning the recording material from the opposite side of the surface thereof which is in contact with the conveyance belt 311 can be applied.

The image-formation operator 33 has inkjet heads 331, etc. provided with nozzles. The image-formation operator 33 sequentially discharges ink from the inkjet heads 331 with respect to the recording material S, which is placed on the conveyance belt 311 and conveyed in the conveyance direction, thereby forming a two-dimensional image on the recording material S. The image-formation operator 33 can discharge ink at one time in an image formation width, which is determined in advance, with respect to the conveyed recording material S. Also, the image-formation operator 33 discharges ink within the ink discharge range from the nozzles of the inkjet heads 331 at appropriate timing.

The image-formation operator 33 illustrated in FIG. 1 is illustrating an example having the four inkjet heads 331, which discharges ink of four colors of yellow (Y), magenta (M), cyan (C), and black (K). The arrangement order of the inkjet heads 331 can be appropriately switched in the order which is preferred for image formation. Also, the image-formation operator 33 may be provided with an inkjet head(s) which discharges ink of another color(s) (including transparent ink) together with these four colors. The image-formation operator 33 uses, for example, ultraviolet-curing ink which changes phases between a sol state and a gel state by a temperature change and is fixed and cured by radiation of ultraviolet rays. The inkjet head 331 has, for example, an ink heating unit 332 (FIG. 3), which maintains the ink in a sol state having appropriate viscosity, and a discharge driver 333 (FIG. 3), which applies pressure changes to discharge the ink.

The fixer 34 irradiates the ink, which has landed on the recording material S, with ultraviolet rays in the fixation range to fix the ink. The fixer 34 is provided with an ultraviolet-ray irradiator 341 (FIG. 3). The light source of the ultraviolet rays of the fixer 34 is not particularly limited, but, for example, a light emitting diode (LED) lamp or the like which emits ultraviolet rays is used.

The reader 35 captures and reads an image on the recording material S, on which the ink has been fixed, and outputs a read signal to the controller 50 (FIG. 3). As the reader 35, for example, an image capturer 351 (FIG. 3) having a line sensor is used. The line sensor can capture an image in the width direction of the recording material S and acquires a two-dimensional image by sequentially carrying out image capturing operations along with conveyance of the recording material S. As image-capturing elements of the line sensor, CCD sensors, CMOS sensors, etc. can be used.

Recording-Material Discharger

The recording-material discharger 40 places and retains the recording materials S, which have been passed from the conveyer 31, until the recording materials are picked up by a user. The recording-material discharger 40 is provided with a discharge tray 41 and guide rollers 42. The guide rollers 42 pinch the recording material S, which has been passed from the conveyer 31, from top and bottom to carry and place the recording material on the discharge tray 41. As well as the placement tray 11, the discharge tray 41 may reduce the lowering amount of the recording material S, which has been sent by the guide rollers 42, in a vertical direction by moving up and down depending on the total weight of the recording materials S placed thereon.

Configuration Diagram of the Image-Forming Apparatus

FIG. 3 is a block diagram illustrating a main configuration of the image-forming apparatus 1.

As illustrated in FIG. 3, the image-forming apparatus 1 is provided with: the controller 50, a storage 61, an input/output interface 62, a display-manipulation receiver 63, a bus 69, the conveyance motor 315, the first recording-material heating unit 22, the second recording-material heating unit 23, the temperature sensor 226 (temperature measurer), the ink heating unit 332, the discharge driver 333, the ultraviolet-ray irradiator 341, the image capturer 351, the pressurizer 26, an air heating unit 80, etc.

Also, the controller 50 is provided with: a main controller 51, a conveyance controller 52, a recording-material heating controller 53, a head controller 54, a fixation controller 55, a read controller 56, an air-heating controller 57, a pressurizing controller 58, etc.

The main controller 51 integrally controls the overall operation of the image-forming apparatus 1. The main controller 51 is provided with a central processing unit (CPU) 511, a random-access memory (RAM) 512, and a read only memory (ROM) 513. The CPU 511 carries out various arithmetic processing and carries out various control operations based on a control program, etc. The RAM 512 provides working memory space for the CPU 511 and stores temporary data. The operations of the main controller 51 (CPU 511) include a process of appropriately processing image data, which has been acquired as a target of image formation and converting the data to final data for driving the discharge driver 333.

The ROM 513 stores various control programs executed by the CPU 511 and initial settings, etc. The ROM 513 may have a rewritable/updatable flash memory or the like. In such a case, the ROM 513 can store updated or added control programs, setting data, etc. in addition to initial settings. The setting data includes the heating temperatures applied by the first recording-material heating unit 22 and the second recording-material heating unit 23 depending on the type (material), thickness, etc. of the recording material, the air pressure applied by the pressurizer 26, and the setting of the conveyance velocity used by the conveyer 31 depending on needs. The setting data may be stored in a non-volatile memory or the like of the storage 61.

The conveyance controller 52 controls the rotary operation of the conveyance motor 315 and carries out control related to the conveyance state of the recording material S.

The recording-material heating controller 53 controls output of the first recording-material heating unit 22 and the second recording-material heating unit 23 based on the temperature measurement data (measurement result), etc. input from the temperature sensor 226.

The head controller 54 controls the operation of the ink heating unit 332 and the discharge driver 333 and causes the ink to land on appropriate positions on the recording material S based on the image data.

The fixation controller 55 controls the operation related to ultraviolet ray irradiation by the ultraviolet-ray irradiator 341.

The read controller 56 controls the operation of the image capturer 351.

The air-heating controller 57 controls output of the later-described air heating unit 80.

The pressurizing controller 58 controls output of the air volume, air pressure, etc. of the pressurizer 26 by controlling operation of the pressurizer 26.

The main controller 51, the conveyance controller 52, the recording-material heating controller 53, the head controller 54, the fixation controller 55, the read controller 56, the air-heating controller 57, and the pressurizing controller 58 are mutually connected via the bus 69. Note that the control operation of each controller constituting the controller 50 may be integrally carried out by each component of the main controller 51. Also, each component of the controller 50 may separately have a CPU or a dedicated hardware circuit.

The storage 61 temporarily stores image data, which serves as a target of image formation, or processed data thereof. The storage 61 includes, for example, a non-volatile memory, etc.

The input/output interface 62 controls communication between the image-forming apparatus 1 and outside in accordance with communication standards. The input/output interface 62 includes, for example, a network card and can carry out transmission/reception of data with an external computer terminal, a print server, etc. via a local area network (LAN; not only wired connection, but also wireless LAN may be included). The received data includes print jobs, in other words, commands, settings, and image-formation-target image data related to image recording operations. The transmitted data includes status information, etc. of image recording operations.

The display-manipulation receiver 63 carries out display operations on a display unit based on the control of the main controller 51, receives input manipulations from outside, converts them to signals, and outputs the signals to the main controller 51. As the display unit, for example, a display device such as a liquid-crystal display, an organic electro-luminescence (EL) display, etc. are used. To receive the input manipulations, a touch screen (touch sensor) or the like provided to be overlapped with the display unit is used. Also, as a component related to display, a LED lamp or the like may be provided in addition to the display unit. Also, as a component related to reception of manipulations, a numeric keypad, a push-button switch, etc. may be provided in addition to the touch screen.

Effects

According to the image-forming apparatus 1 of the above-described configuration, contactless heating units (the first recording-material heating unit 22 and the second recording-material heating unit 23) are provided as the heating unit 20. Therefore, the recording material S can be heated without causing damage by contact with the heating unit.

Also, the heating unit 20 can increase the air pressure in the chassis 21 by providing the pressurizer 26.

By virtue of this, with respect to the space between the contactless first recording-material heating unit 22, the second recording-material heating unit 23, and the recording material S, entrance of unheated air from outside the heating unit 20 can be restricted. Therefore, in the heating unit 20 uneven heating of the recording material S caused by inflow of air from outside is restricted, and the heating stability of the recording material S is improved.

Furthermore, since the output of the first recording-material heating unit 22 and the second recording-material heating unit 23 is individually controlled, temperature control of the image formation surface of the recording material S can be carried out with higher accuracy.

2. Second Embodiment of Image-Forming Apparatus

Next, a second embodiment of an image-forming apparatus will be described.

In the above described first embodiment, the configuration which increases the overall air pressure in the chassis 21 has been described. However, the heating unit of the image-forming apparatus may employ a configuration which partially increases the air pressure in the chassis 21. Specifically, in the chassis 21, if the air pressure of the part of the recording-material inlet 24 is sufficiently high, the air that flows into the chassis 21 by conveyance of the recording material S can be restricted. Therefore, as the second embodiment of the image-forming apparatus, a configuration in which the air pressure of the recording-material inlet 24 of the chassis 21 is partially increased will be described. Note that, in the second embodiment, except for the configuration related to the chassis 21 and the pressurizer 26, a configuration similar to that of the above described first embodiment can be applied. Therefore, detailed descriptions about the configuration similar to that of the above described first embodiment will be omitted.

Recording-Material Heating Unit

Figure 4:
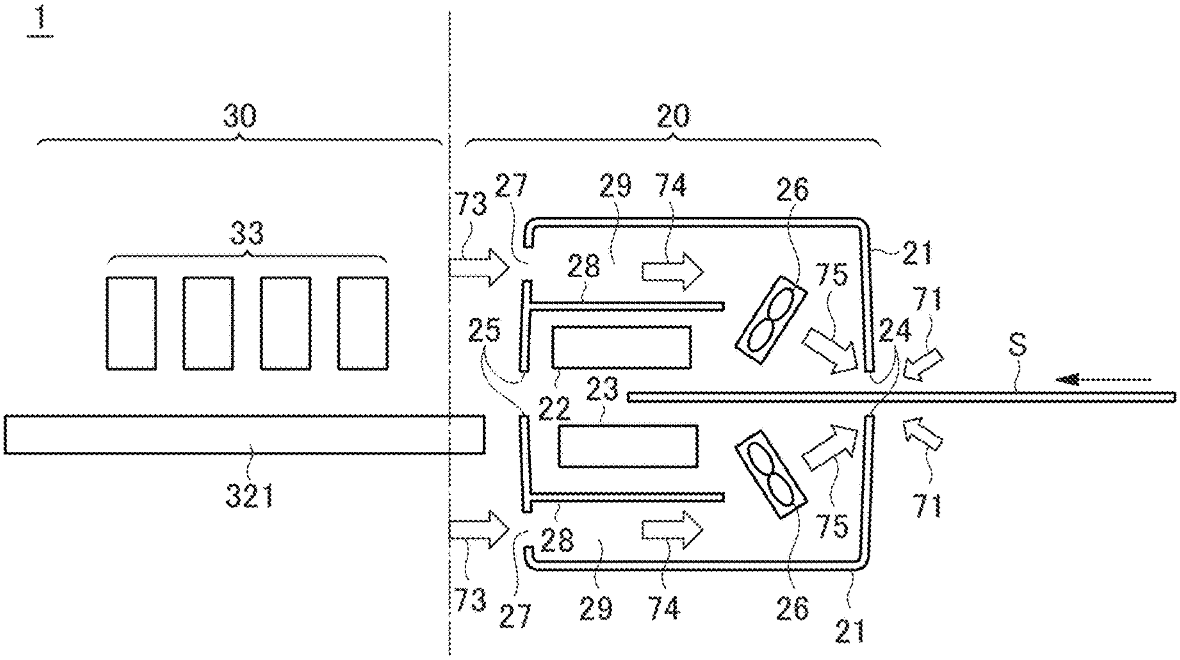
FIG. 4 is a diagram illustrating part of a heating unit and an image-former of an image-forming apparatus of a second embodiment.

FIG. 4 illustrates part of the heating unit 20 and the image-former 30 corresponding to the image-forming apparatus 1 illustrated in FIG. 1. FIG. 4 only illustrates the image-formation operators 33 and the supporter 321 as the image-former 30. In the image-forming apparatus 1, a configuration similar to that of the image-forming apparatus 1 illustrated in FIG. 1 can be applied except for the configuration of the heating unit 20.

The heating unit 20 illustrated in FIG. 4 has the chassis 21, the first recording-material heating unit 22, the second recording-material heating unit 23, and the pressurizer 26. The first recording-material heating unit 22 and the second recording-material heating unit 23 have configurations similar to those of the above described first embodiment.

The chassis 21 has the recording-material inlet 24, the recording-material outlet 25, and the gas inflow openings 27 for supplying air 73 from outside to the pressurizer 26. The gas inflow openings 27 have openings at the positions which are more distant from the conveyance path of the recording material S than the first recording-material heating unit 22 and the second recording-material heating unit 23 in the downstream side in the conveyance direction of the recording material S of the chassis 21. Also, the gas inflow openings 27 are provided at two locations in the image-formation-surface side and the back-surface side of the recording material S in the chassis 21.

The pressurizers 26 are disposed in the conveyance-direction upstream side of the recording material S with respect to the first recording-material heating unit 22 and the second recording-material heating unit 23 in the chassis 21. The pressurizers 26 in the chassis 21 are provided at two locations, i.e., the pressurizer 26 (first pressurizer) in the image-formation-surface side of the recording material S and the pressurizer 26 (second pressurizer) in the back-surface side.

The pressurizers 26 are disposed in the direction so that the air 72, which has been introduced from the gas inflow opening 27, is discharged toward the recording-material inlet 24 of the chassis 21. By virtue of this, the air pressure inside the recording-material inlet 24 can be increased in the chassis 21. Alternatively, the pressurizers 26 send air 75, which is equivalent to or more than the air 71 which is drawn by the conveyance of the recording material S and is to flow into the chassis 21, from inside of the recording-material inlet 24.

In this manner, by discharging the air 75 toward the recording-material inlet 24 of the chassis 21 by the pressurizers 26, inflow of the air 71, which is drawn by the conveyance of the recording material S, into the chassis 21 can be restricted. As a result, lowering in the uniformity of the in-plane temperature due to the inflow of the air 71 into the heating unit can be restricted, and lowering in the heating stability of the recording material S in the heating unit 20 can be sufficiently restricted.

Note that, when the recording material S is conveyed into the chassis 21, the air 75 discharged from the pressurizers 26 (first pressurizer) in the image-formation-surface side is shielded by the recording material S, and it becomes difficult to send the air 75 from the side in which the pressurizers 26 (first pressurizers) are installed in the image-formation-surface side to the opposite side of the recording material S. Therefore, as the pressurizers 26, the pressurizer 26 (first pressurizer) in the image-formation-surface side and the pressurizer 26 (second pressurizer) in the back-surface side have to be disposed. Also, the number of the gas inflow openings 27 provided in the chassis 21 is not particularly limited. The gas inflow opening(s) 27 may be provided to correspond to the number of the installed pressurizers 26, or the gas inflow opening(s) 27 may be provided at one location or be provided to correspond to the number equal to or more than the installed pressurizers 26.

Also, if the gas inflow openings 27 are in the conveyance-direction downstream side of the recording material S with respect to the first recording-material heating unit 22 and the second recording-material heating unit 23, the air 73 which has flowed into from the gas inflow openings 27 flows toward the pressurizer 26 in the chassis 21 as air 74. In this process, the air 74 flowing in the chassis 21 may contact the first recording-material heating unit 22 and the second recording-material heating unit 23. In this case, the temperatures of the first recording-material heating unit 22 and the second recording-material heating unit 23 are easily lowered by the air 74, and the stability of the heating temperature is easily lowered. Therefore, shielding members 28 for shielding movement of the air 74 are provided between the air 74, which flows in from the gas inflow openings 27 into the chassis 21, and the first recording-material heating unit 22 and the second recording-material heating unit 23. Between the outer peripheral part of the chassis 21 and the shielding member 28, flow channels 29 through which the air 74 passes are provided by the shielding members 28.

By providing the shielding members 28, contact between the air 74, which has flowed in from the gas inflow opening 27, and the first recording-material heating unit 22 and the second recording-material heating unit 23 can be restricted. Therefore, the temperatures of the first recording-material heating unit 22 and the second recording-material heating unit 23 can be stabilized, and the heating stability of the recording material S is improved.

3. Third Embodiment of Image-Forming Apparatus

Next, a third embodiment of an image-forming apparatus will be described.

The image-forming apparatus of the third embodiment has a configuration in which the air pressure in the chassis 21 is partially increased as well as the image-forming apparatus of the above described second embodiment. Therefore, also in the image-forming apparatus of the third embodiment, a configuration which partially increases the air pressure of the recording-material inlet 24 of the chassis 21 will be described. Note that, in the third embodiment, except for the configuration related to the chassis 21 and the pressurizer 26, a configuration similar to that of the above described first embodiment and the second embodiment can be applied. Therefore, detailed descriptions about the configuration similar to that of the above described first embodiment and the second embodiment will be omitted.

Recording-Material Heating Unit

Figure 5:
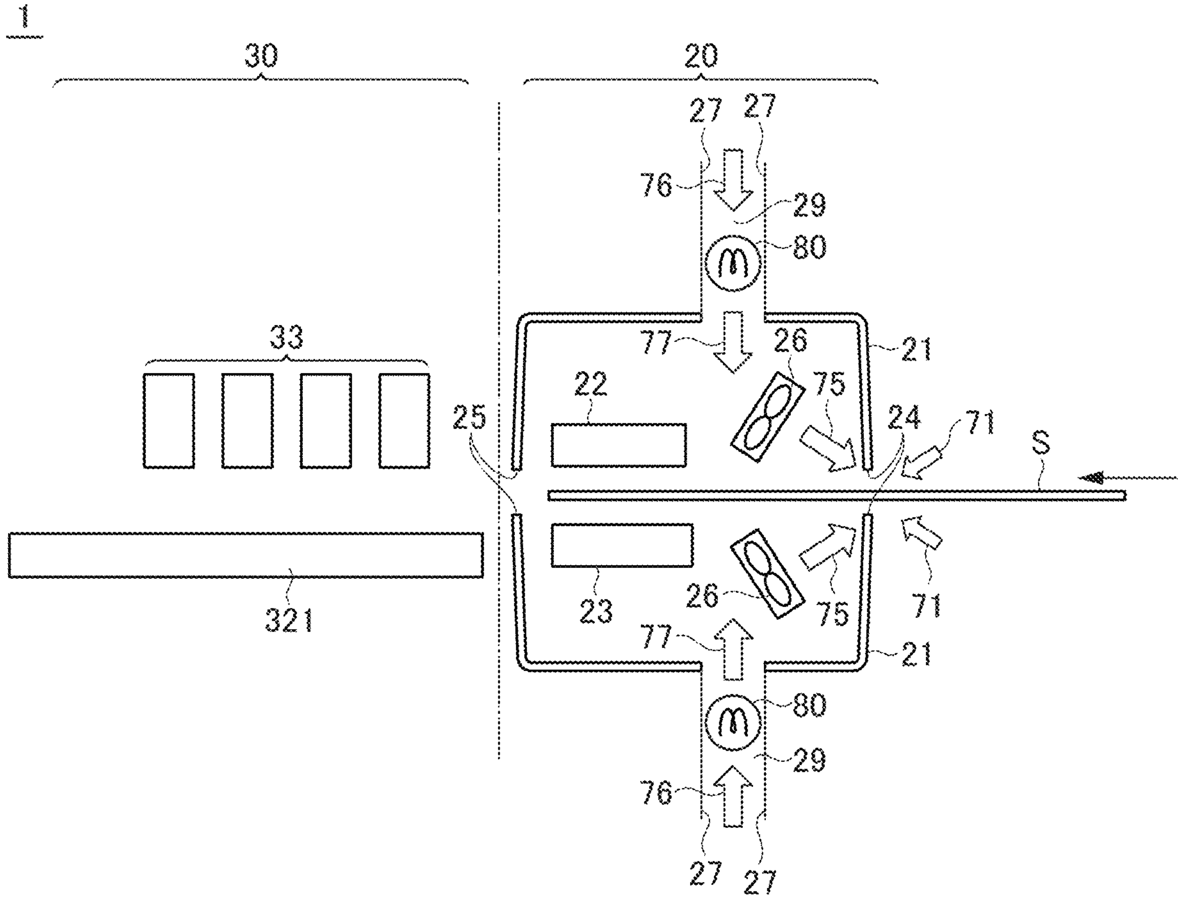
FIG. 5 is a diagram illustrating part of a heating unit and an image-former of an image-forming apparatus of a third embodiment.

FIG. 5 illustrates part of the heating unit 20 and the image-former 30 corresponding to the image-forming apparatus 1 illustrated in FIG. 1. FIG. 5 only illustrates the image-formation operators 33 and the supporter 321 as the image-former 30. In the image-forming apparatus 1, a configuration similar to that of the image-forming apparatus 1 illustrated in FIG. 1 and FIG. 4 can be applied except for the configuration of the heating unit 20.

The heating unit 20 illustrated in FIG. 5 has the chassis 21, the first recording-material heating unit 22, the second recording-material heating unit 23, and the pressurizer 26. The first recording-material heating unit 22 and the second recording-material heating unit 23 have configurations similar to those of the above described first embodiment.

The pressurizers 26 have a configuration similar to those of the above described second embodiment. Therefore, the pressurizers 26 are disposed in the conveyance-direction upstream side of the recording material S with respect to the first recording-material heating unit 22 and the second recording-material heating unit 23 in the chassis 21. The pressurizers 26 are provided at two locations, i.e., the pressurizer 26 (first pressurizer) in the image-formation-surface side of the recording material S and the pressurizer 26 (second pressurizer) in the back-surface side. By discharging the air 75 toward the recording-material inlet 24 of the chassis 21 from the pressurizers 26, inflow of the air 71, which is drawn by the conveyance of the recording material S, into the chassis 21 can be restricted. As a result, lowering in the uniformity of the in-plane temperature due to the inflow of the air 71 into the heating unit can be restricted, and lowering in the heating stability of the recording material S in the heating unit 20 can be sufficiently restricted.

The chassis 21 has the recording-material inlet 24, the recording-material outlet 25, and the gas inflow openings 27 for supplying air 73 from outside to the pressurizer 26. The gas inflow openings 27 are provided at two locations in the upper surface side and the bottom surface side of the chassis 21. Also, the gas inflow openings 27 are provided in the conveyance-direction upstream side of the recording material S with respect to the first recording-material heating unit 22 and the second recording-material heating unit 23 and in the downstream side with respect to the pressurizers 26. Note that, regarding an upper surface and a bottom surface of the chassis 21, in the heating unit 20, the image-formation-surface side of the recording material S serves as the upper surface side of the chassis 21, and the back-surface side of the recording material S serves as a bottom surface side of the chassis 21.

Also, in the chassis 21, each of flow channels 29 through which air passes is provided between the gas inflow opening 27, into which outside air 76 flows, and the position into which air 77 flows in the chassis 21. In this manner, the gas inflow opening 27 is provided at a position different from the positions of the recording-material inlet 24 and the recording-material outlet 25 and is provided at the position from which the air 77 can be sent to the pressurizer 26 via the flow channel 29.

Also, in the flow channel 29, the air heating unit 80 for heating the air which passes through in the flow channel 29 is disposed. The air heating unit 80 is not particularly limited, for example, as long as the air in the flow channel 29 can be heated, and, for example, a heating apparatus such as a sheathed heater, a carbon heater, a cartridge heater, or the like can be applied.

Also, the air heating unit 80 is not required to be provided in the flow channel as long as the air which passes through the flow channel 29 can be heated. For example, the air heating unit 80 may be a heating apparatus or the like which is installed on an outer wall of the flow channel 29.

By providing the air heating unit 80 in the flow channel 29, the air 76 which flows in through the gas inflow opening 27 from outside the chassis 21 can be heated. Then, the air 77 heated by the air heating unit 80 can be introduced into the chassis 21. Normally, the temperature of the air 76 outside the chassis 21 is lower than that in the chassis 21 in which the first recording-material heating unit 22 and the second recording-material heating unit 23 are disposed. More specifically, when the air 76 having a low temperature is introduced into the chassis 21 without change, the temperatures of the first recording-material heating unit 22 and the second recording-material heating unit 23 are easily lowered by the air 76, and the stability of the heating temperature is easily lowered. Therefore, by virtue of the above-described configuration, the air 77 heated by the air heating unit 80 can be introduced into the chassis 21, and temperature reduction of the air in the chassis 21 can be restricted. As a result, the temperatures of the first recording-material heating unit 22 and the second recording-material heating unit 23 can be stabilized, and the heating stability of the recording material S is improved.

4. Fourth Embodiment of Image-Forming Apparatus

Next, a fourth embodiment of an image-forming apparatus will be described.

In the above described first embodiment, the configuration which increases the overall air pressure in the chassis 21 by providing the pressurizer 26 in the chassis 21 has been described. However, a configuration which increases the air pressure of the entire interior of the chassis 21 without using the pressurizer 26 may be employed. Specifically, by adjusting the opening areas of the recording-material inlet 24 and the recording-material outlet 25, the air pressure of the entirety of the interior of the chassis 21 can be increased more than the air which flows into the chassis 21 by conveyance of the recording material S.

Recording-Material Heating Unit

Figure 6:
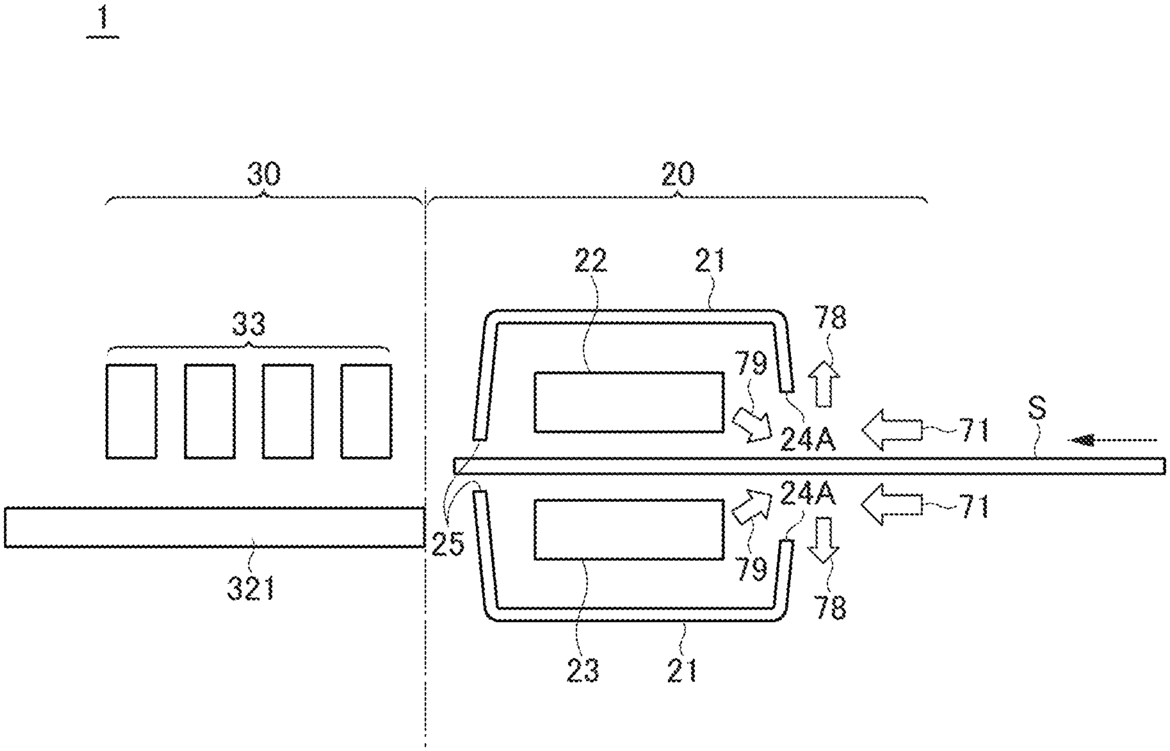
FIG. 6 is a diagram illustrating part of a heating unit and an image-former of an image-forming apparatus of a fourth embodiment.

FIG. 6 illustrates part of the heating unit 20 and the image-former 30 corresponding to the image-forming apparatus 1 illustrated in FIG. 1. FIG. 6 only illustrates the image-formation operators 33 and the supporter 321 as the image-former 30. In the image-forming apparatus 1, a configuration similar to that of the image-forming apparatus 1 illustrated in FIG. 1 can be applied except for the configuration of the heating unit 20.

The heating unit 20 illustrated in FIG. 6 has the chassis 21, the first recording-material heating unit 22, and the second recording-material heating unit 23. The first recording-material heating unit 22 and the second recording-material heating unit 23 have configurations similar to those of the above described first embodiment.

The chassis 21 has a recording-material inlet 24A, which is provided in the upstream side end (receiving end) in the conveyance direction of the recording material S, and a recording-material outlet 25, which is provided in the downstream side end (sending end). The recording-material outlet 25 is a slit-like opening through which the recording material S can pass and has a configuration similar to the above described first embodiment.

The recording-material inlet 24A has a slit-like opening through which the recording material S passes and has a larger area of the opening than the recording-material outlet 25. By causing the opening area of the recording-material inlet 24A to be larger than the recording-material outlet 25, the air pressure in the chassis 21 can be increased in conveyance of the recording material S to the chassis 21. Principles that increase the air pressure in the chassis 21 by this area difference of the openings are assumed as following.

As illustrated in FIG. 6, when the recording material S is conveyed to the chassis 21, the outside air 71 is prompted to flow into the chassis 21 from the recording-material inlet 24 in a manner that the air is drawn by the conveyance of the recording material S. In this process, from the point when a distal end part of the recording material S enters the chassis 21, the air 71 flows into the chassis 21, and the air pressure in the chassis 21 is temporarily increased.

The air in the chassis 21 with the temporarily increased pressure is prompted to flow out to outside the chassis 21 where the air pressure is low. At this point, since there is a difference between the opening areas of the recording-material inlet 24A and the recording-material outlet 25, the air in the chassis 21 tends to flow out from the opening having the larger opening area which is easy to pass through. In the chassis 21 illustrated in FIG. 6, since the recording-material inlet 24A has the larger opening area than the recording-material outlet 25, more air 79 in the chassis 21 flows out from the recording-material inlet 24A side than from the recording-material outlet 25 side.

As a result, the air 71 which follows the distal end part of the recording material S and is prompted to flow into the chassis 21 collides with the air 79, which is prompted to flow out from the chassis 21. Then, when the temporarily increased air pressure of the chassis 21 becomes higher than the pressure of the air 71, which is prompted by the recording material S to flow into the chassis 21, the air 71 cannot flow into the chassis 21, but flows to outside the chassis 21 like air 78.

As described above, the chassis 21 can increase the air pressure in the chassis 21 in the conveyance of the recording material S to the chassis 21 since the chassis 21 has the configuration in which the opening area of the recording-material inlet 24A is larger than the opening area of the recording-material outlet 25. Also, inflow of the air 71, which is drawn by the conveyance of the recording material S, into the chassis 21 can be restricted. As a result, lowering in the uniformity of the in-plane temperature due to the inflow of the air 72 into the heating unit can be restricted, and lowering in the heating stability of the recording material S in the heating unit 20 can be sufficiently restricted.

Note that the present invention is not limited to the configuration described in the above-described embodiment example, and various modifications and changes can be made without departing from the configuration of the present invention.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1 . . . image-forming apparatus
10 . . . recording-material supplier
11 . . . placement tray
12 . . . sending roller
20 . . . heating unit
21 . . . chassis
22 . . . first recording-material heating unit
23 . . . second recording-material heating unit
24, 24*a* . . . recording-material inlet
25 . . . recording-material outlet
26 . . . pressurizer
27 . . . gas inflow opening
28 . . . shielding member
29 . . . flow channel
30 . . . image-former
31 . . . conveyer
33 . . . image-formation operator
34 . . . fixer
35 . . . reader
40 . . . recording-material discharger
41 . . . discharge tray
42 . . . guide roller
50 . . . controller
51 . . . main controller
52 . . . conveyance controller
53 . . . recording-material heating controller
54 . . . head controller
55 . . . fixation controller
56 . . . read controller
57 . . . air-heating controller
58 . . . pressurizing controller
61 . . . storage
62 . . . input/output interface
63 . . . display-manipulation receiver
69 . . . bus
70, 71, 72, 73, 74, 75, 76, 77, 78, 79 . . . air
80 . . . air heating unit
226 . . . temperature sensor
311 . . . conveyance belt
312 . . . drive roller
313 . . . driven roller
315 . . . conveyance motor
321 . . . supporter
322, 323 . . . supporter
331 . . . inkjet head
332 . . . ink heating unit
333 . . . discharge driver
341 . . . ultraviolet-ray irradiator
351 . . . image capturer
511 . . . CPU
512 . . . RAM
513 . . . ROM

The invention claimed is:

1. An image-forming apparatus comprising:

a conveyer that conveys a recording material, an image-former that discharges ink onto the conveyed recording material, a recording-material heating unit that heats the recording material disposed in an upstream side in a conveyance direction of the recording material with respect to the image-former, a chassis that covers the recording-material heating unit, has a recording-material inlet provided in the upstream side in the conveyance direction of the recording material with respect to the recording-material heating unit, and has a recording-material outlet provided in a downstream side in the conveyance direction of the recording material with respect to the recording-material heating unit, a pressurizer that is provided in the chassis and increases an air pressure in the chassis; and a gas inflow opening that is provided in the chassis and supplies air to the pressurizer from outside the chassis.

2. The image-forming apparatus according to claim 1, wherein the recording-material heating unit has a contactless heating apparatus that heats the recording material without contact.

3. The image-forming apparatus according to claim 1, wherein a flow channel through which air passes is provided between the gas inflow opening and the pressurizer.

4. The image-forming apparatus according to claim 3, further comprising, between the gas inflow opening and the pressurizer, an air heating unit that heats the air passing through the flow channel.

5. The image-forming apparatus according to claim 3, further comprising, between the flow channel and the recording-material heating unit, a shielding member that shields contact of the air with the heating unit, the air flowing in from the gas inflow opening.

6. The image-forming apparatus according to claim 1, wherein the pressurizer sends air from interior of the chassis toward the recording-material inlet.

7. The image-forming apparatus according to claim 1, wherein the pressurizer has a first pressurizer disposed in an image-formation-surface side of the recording material and has a second pressurizer disposed in an opposite surface side of the image formation surface.

8. The image-forming apparatus according to claim 1, further comprising a pressurizing controller that controls drive of the pressurizer; wherein the pressurizing controller controls output of the pressurizer depending on a conveyance velocity of the recording material and adjusts an air pressure in the chassis.

9. The image-forming apparatus according to claim 1, wherein the recording-material heating unit has a first recording-material heating unit disposed in an image-formation-surface side of the recording material and has a second recording-material heating unit disposed in an opposite surface side of the image formation surface.

10. The image-forming apparatus according to claim 9, further comprising a recording-material heating controller that controls driving of the recording-material heating unit; wherein the recording-material heating controller independently controls output of the first recording-material heating unit and output of the second recording-material heating unit.

11. The image-forming apparatus according to claim 10, wherein the recording-material heating unit has a first recording-material heating unit disposed in an image-formation-surface side of the recording material and has a second recording-material heating unit disposed in an opposite surface side of the image formation surface.

12. The image-forming apparatus according to claim 11, further comprising a recording-material heating controller that controls driving of the recording-material heating unit; wherein the recording-material heating controller independently controls output of the first recording-material heating unit and output of the second recording-material heating unit.

13. An image-forming apparatus comprising:

a conveyer that conveys a recording material, an image-former that discharges ink onto the conveyed recording material, a recording-material heating unit that heats the recording material disposed in an upstream side in a conveyance direction of the recording material with respect to the image-former; and a chassis that covers the recording-material heating unit, has a recording-material inlet provided in the upstream side in the conveyance direction of the recording material with respect to the recording-material heating unit, and has a recording-material outlet provided in a downstream side in the conveyance direction of the recording material with respect to the recording-material heating unit, the recording-material outlet having a smaller opening area than the recording-material inlet.

* * * * *